US 10,540,244 B2

(12) United States Patent
Chowdhary et al.

(10) Patent No.: US 10,540,244 B2
(45) Date of Patent: *Jan. 21, 2020

(54) SELECTING MASTER TIME OF DAY FOR MAXIMUM REDUNDANCY

(71) Applicant: International Business Machines Corporation, Armonk, NY (US)

(72) Inventors: Manish Kumar Chowdhary, Bangalore (IN); Deepak Kodihalli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,616

(22) Filed: Oct. 31, 2017

(65) Prior Publication Data

US 2018/0052746 A1 Feb. 22, 2018

Related U.S. Application Data

(63) Continuation of application No. 14/880,257, filed on Oct. 11, 2015, now Pat. No. 9,886,357.

(51) Int. Cl.
*G06F 11/00* (2006.01)
*G06F 11/20* (2006.01)
*G06F 11/30* (2006.01)
*G06F 11/18* (2006.01)

(52) U.S. Cl.
CPC ........ *G06F 11/2028* (2013.01); *G06F 11/184* (2013.01); *G06F 11/2017* (2013.01); *G06F 11/2023* (2013.01); *G06F 11/2025* (2013.01); *G06F 11/2038* (2013.01); *G06F 11/3024* (2013.01); *G06F 2201/805* (2013.01)

(58) Field of Classification Search
CPC ............... G06F 11/3024; G06F 11/184; G06F 11/2017; G06F 11/2023; G06F 11/2025
See application file for complete search history.

(56) References Cited

U.S. PATENT DOCUMENTS

| 4,377,000 A | 3/1983 | Staab |
| 5,530,846 A * | 6/1996 | Strong ...................... G06F 1/14 |
| | | 713/400 |

(Continued)

OTHER PUBLICATIONS

Martins et al., "An Approach to the Synchronization of Backup Masters in Dynamic Master-Slave Systems," Universidade de Aveiro Aveiro, Portugal, 2002, 4 pages.

(Continued)

*Primary Examiner* — Charles Ehne
(74) *Attorney, Agent, or Firm* — VanLeeuwen & VanLeeuwen; David Quinn

(57) ABSTRACT

An approach is provided in which a system selects a first processor as a master Time of Day (TOD) processor in a first TOD topology in response to determining that the first processor is directed connected to an oscillator. The system then assigns a second processor as an alternate master TOD processor to a second TOD topology based upon determining that the second processor is on a different node than the first processor. The system configures to the first TOD topology and, when the system detects a TOD failure, the system re-configures to the second TOD topology.

20 Claims, 7 Drawing Sheets

(56) References Cited

U.S. PATENT DOCUMENTS

| | | | |
|---|---|---|---|
| 5,915,082 A * | 6/1999 | Marshall | G06F 11/10 |
| | | | 714/11 |
| 5,919,266 A | 7/1999 | Sud et al. | |
| 6,199,179 B1 | 3/2001 | Kauffman et al. | |
| 6,226,734 B1 | 5/2001 | Kleinsorge et al. | |
| 7,487,377 B2 * | 2/2009 | Swaney | G06F 1/14 |
| | | | 713/375 |
| 7,525,998 B2 | 4/2009 | Driediger et al. | |
| 7,865,758 B2 | 1/2011 | Swaney | |
| 8,074,110 B2 | 12/2011 | Vera et al. | |
| 8,145,880 B1 | 3/2012 | Cismas et al. | |
| 9,395,748 B1 | 7/2016 | Labonte et al. | |
| 10,338,229 B2 | 7/2019 | Levy et al. | |
| 2009/0100189 A1 * | 4/2009 | Bahren | H04L 12/422 |
| | | | 709/231 |
| 2011/0087922 A1 * | 4/2011 | Lee | G06F 11/2242 |
| | | | 714/26 |
| 2011/0191627 A1 | 8/2011 | Koning et al. | |
| 2015/0067318 A1 | 3/2015 | Henry et al. | |
| 2017/0103004 A1 | 4/2017 | Chowdhary et al. | |
| 2017/0103005 A1 | 4/2017 | Chowdhary et al. | |
| 2019/0058539 A1 | 2/2019 | Williams et al. | |

OTHER PUBLICATIONS

"List of IBM Patents or Patent Applications Treated as Related," Letter from Leslie A. Van Leeuwen, Oct. 31, 2017, 1 page.

* cited by examiner

SELECTING MASTER TIME OF DAY FOR MAXIMUM REDUNDANCY

BACKGROUND

Accurate timing is important to operating systems and hypervisors for workload management, and generally maintaining order of various events throughout a system. Each processor in a symmetric multiprocessor system (SMP) is required to have the same time. TOD (Time of day) is a process of maintaining uniform time value across each processor in a symmetric multiprocessor (SMP) system.

One approach to achieve time uniformity between processors is by implementing a counter on all the processors in an SMP network of inter-connected chips such that all the counters are incremented simultaneously throughout the system. In this approach, each processor maintains its own counter and increments in "steps" based upon a stepping signal received from a master chip. With appropriate configuration of delays at each processor, each processor's counter increments at the same instance in time.

TOD topologies are typically configured by designating one of the processors as a master TOD processor. The master processor is connected to an external oscillator and generates a step signal that is provided to other processors in the TOD topology. When TOD topologies are created they are designated as primary and secondary topologies, when the TOD start running with one of the topology, that topology is called active topology and the one that is non-active is known as backup.

BRIEF SUMMARY

According to one embodiment of the present disclosure, an approach is provided in which a system selects a first processor as a master Time of Day (TOD) processor in a first TOD topology in response to determining that the first processor is directed connected to an oscillator. The system then assigns a second processor as an alternate master TOD processor to a second TOD topology based upon determining that the second processor is on a different node than the first processor. The system configures to the first TOD topology and, when the system detects a TOD failure, the system re-configures to the second TOD topology.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
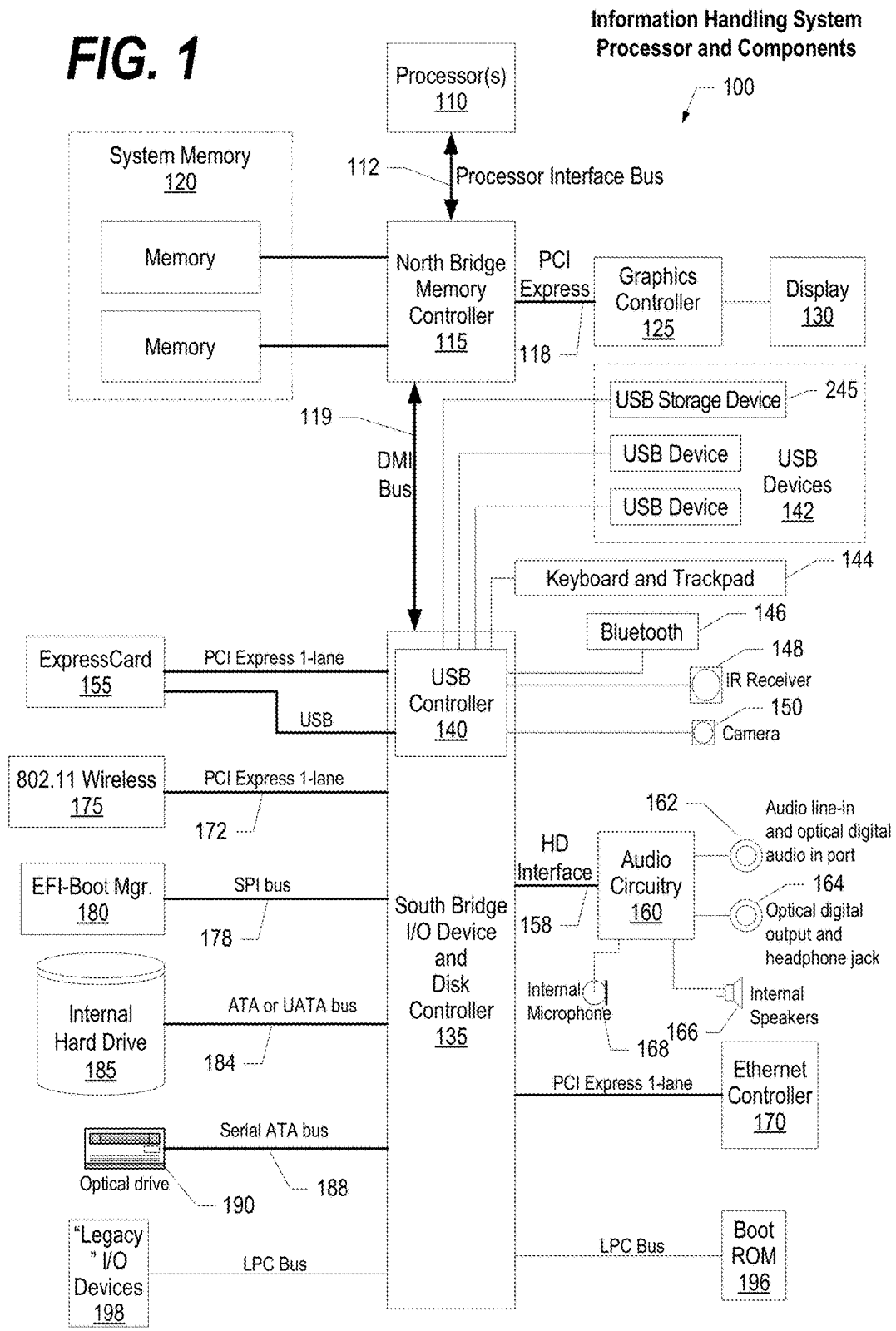
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
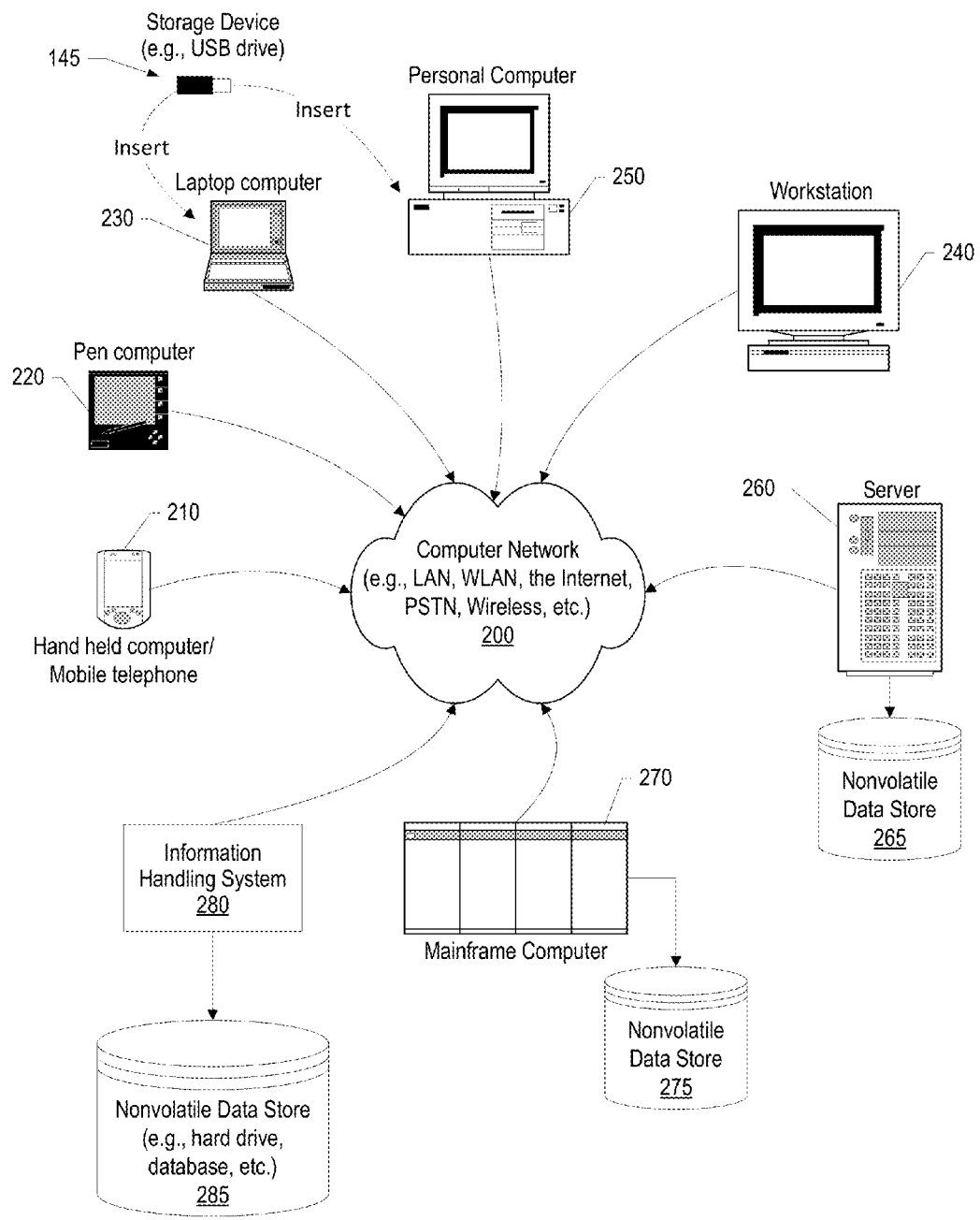
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

FIGS. 3-8 depict an approach that can be executed on an information handling system. The information handling system selects a first processor as a master Time of Day (TOD) processor in a first TOD topology based upon criteria such as the number of functioning cores in the processor and a directly connected oscillator. The information handling system then assigns a second processor as an alternate master TOD processor to a second TOD topology based upon criteria such as the second processor's node relative to the first processor's node, the number of functioning cores, a directly connected oscillator, etc.

During operation, the information handling system uses in the first TOD topology for timing synchronization, but when a TOD failure is detected, that requires a topology switch, the information system performs a failover that re-configures the information handling system to use the second TOD topology. The probability of a successful TOD failover is increased by selecting the alternate master TOD processor based upon various criteria relative to the master TOD processor as discussed herein.

Figure 3:
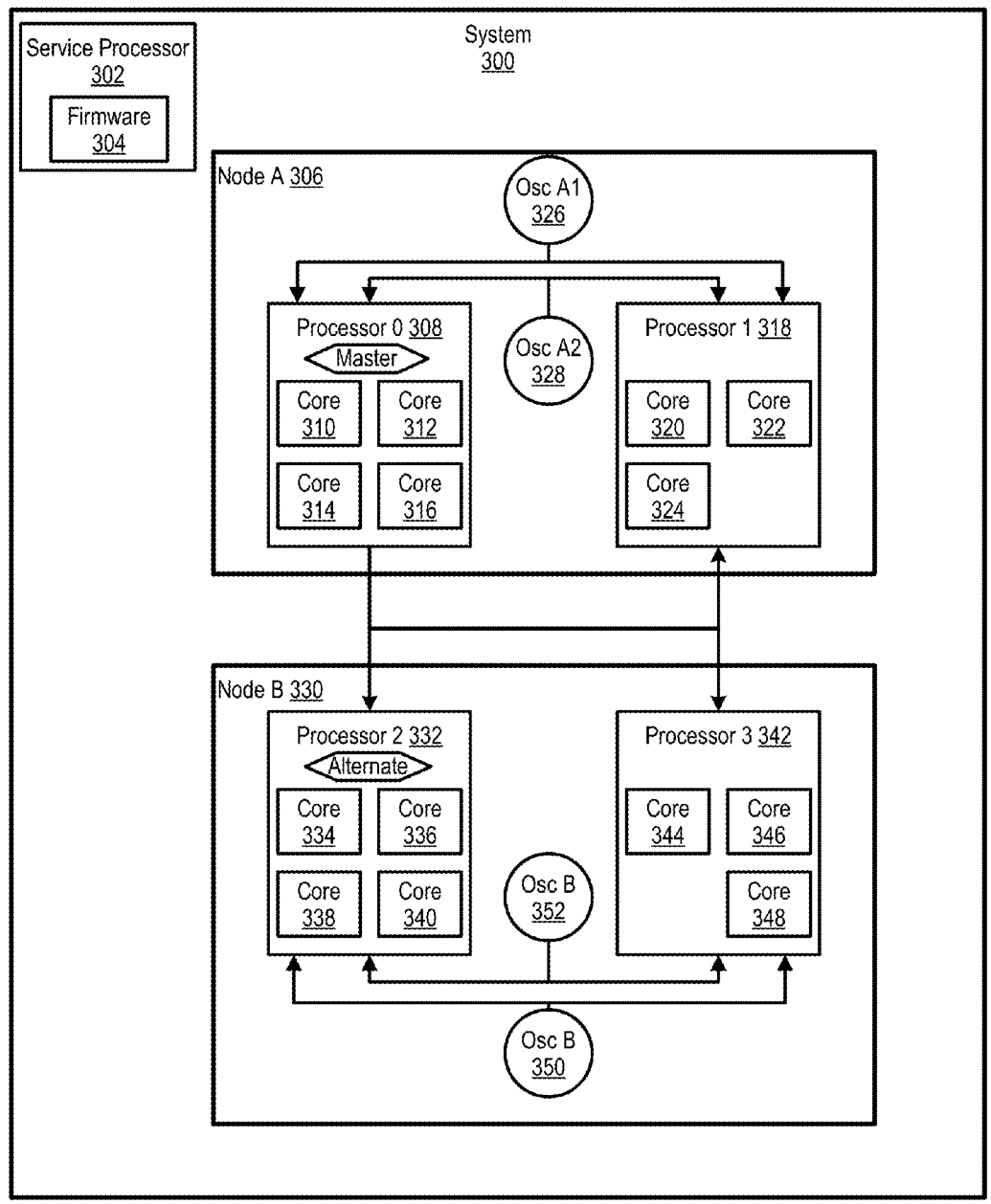
FIG. 3 is an exemplary diagram depicting a distributed computer system environment that dynamically assigns a master TOD processor and an alternate master TOD processor based upon a set of criteria that increases the resilience of the TOD network against errors and increases the probability of successful TOD failover.

FIG. 3 is an exemplary diagram depicting a distributed computer system environment that dynamically assigns a master TOD processor and an alternate master TOD processor based upon a set of criteria that increases the resilience against errors and enhances probability of successful TOD topology failover, if TOD error necessitates a failover.

System 300 includes service processor 302. Service processor 302 enables service tasks such as booting processors, running diagnostics on the hardware components of system 300, analyzing errors, system resets, reboots, etc. Service processor 302 includes firmware 304, which is software embedded in a hardware device. Firmware 304 creates TOD topologies, initializes TOD hardware logic, and analyzes errors that the TOD hardware logic directs toward firmware 304. In one embodiment, system 300 may configure TOD topologies utilizing an entity other than a service processor.

System 300 also includes nodes A 306 and B 330. Each of nodes A 306 and B 330 is a processing subsystem that executes user applications. The embodiment shown in FIG. 3 depicts each node containing two processors and two oscillators. Node A 306 includes processors 308, 318, with oscillators 326 and 328. Node B 330 includes processors 332, 334, with oscillators 350 and 352. As those skilled in the art can appreciate, system 300 may include nodes with different configurations than what is shown in FIG. 3, such as more/less processors and more/less oscillators.

During initial program load (IPL), firmware 304 gathers vital product data from system 300's processors, such as voltage, frequency and temperature settings along with list of non-functioning components (e.g., bad cores), and retrieves persistence information from earlier IPLs and/or runtime usage of the system that identifies non-functioning cores within each processor. In turn, firmware 304 configures a primary TOD topology that designates a master TOD processor having the highest number of functioning cores and connects directly to an oscillator (see FIG. 5 and corresponding text for further details). FIG. 3 shows that processor 0 308 was selected as the master TOD processor. As such, processor 0 308 provides TOD information to the other processors 318, 330, and 342, such as step signal to increment each processor's counters.

Firmware 304 also determines a backup TOD topology that designates an alternate master TOD processor that will provide the highest immunity to a system-wide TOD failure if an error is detected on active TOD topology. Firmware 304 uses a set of criteria to determine which alternate master TOD processor to select. The set of criteria includes a processor's node location and oscillator connection relative to the master TOD's node location and oscillator connection. For example, firmware 304 may select an alternate master TOD processor that is on a different node than the master TOD processor, and is connected to a different oscillator than the master TOD processor.

Figure 6:
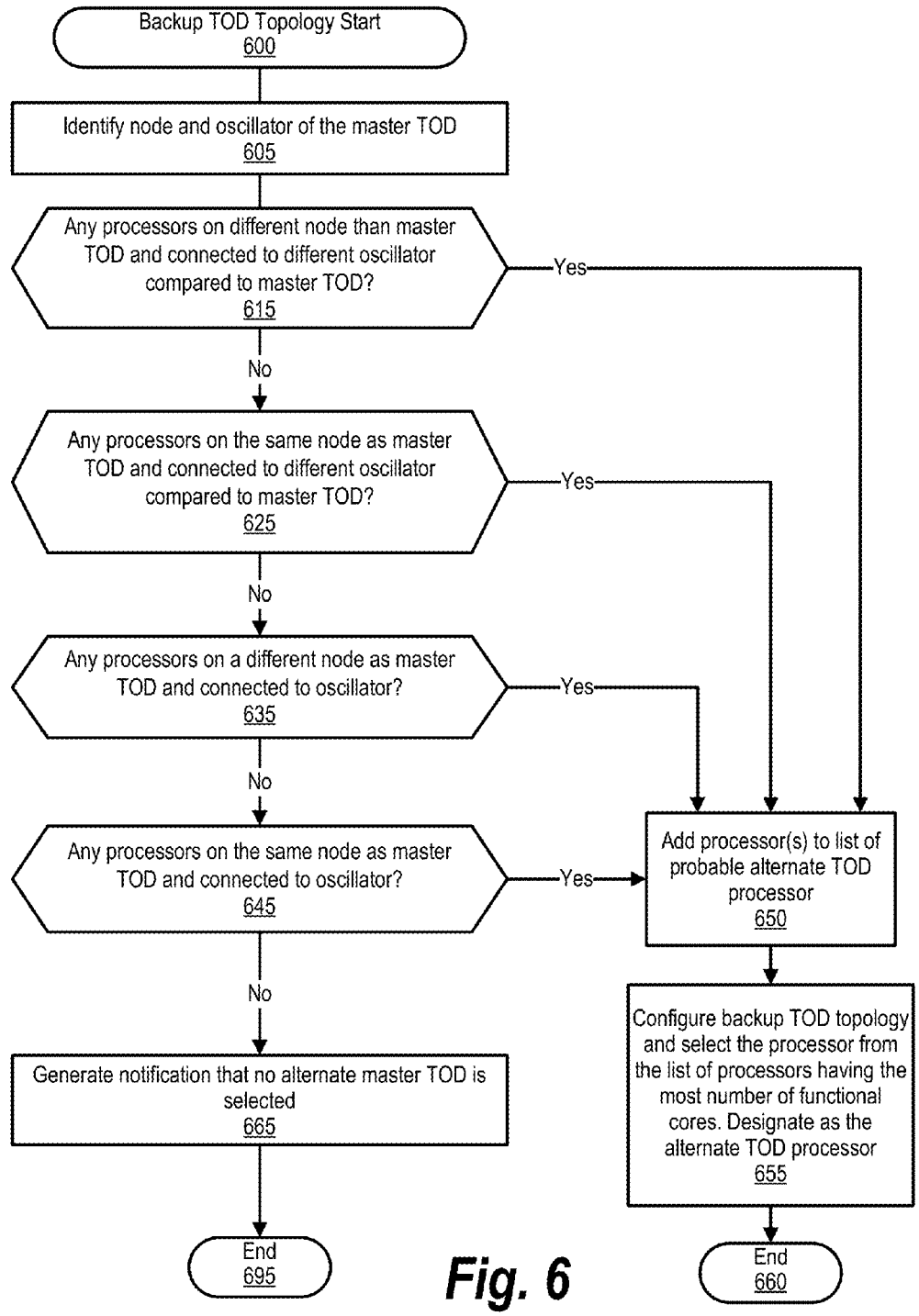
FIG. 6 is an exemplary flowchart depicting steps taken by a system to dynamically configure a backup TOD topology having an alternate master TOD processor.

When multiple processors meet similar criteria, firmware 304 selects the processor that has the most number of functioning cores as the alternate master TOD processor (see FIG. 6 and corresponding text for further details). FIG. 3 shows that processor 2 332 is designated as the alternate master TOD processor because processor 2 332 is on a different node than processor 0 308, is connected to a different oscillator than processor 0 308, and has more functioning cores than processor 3 342.

When a TOD failure occurs, such as from processor 0 308, oscillator A1 326, power issues, connectivity issues, or by other processors, firmware 304 determines whether the alternate processor (processor 2 332) was the cause of the TOD failure and, if not, reconfigures system 300 to the backup TOD topology by performing a failover, which designates processor 2 332 as the new master TOD processor. In turn, firmware 304 dynamically determines a different backup TOD topology having a different alternate master TOD processor should another TOD failure occur. (See FIGS. 4, 7, and corresponding text for further details).

Figure 4:
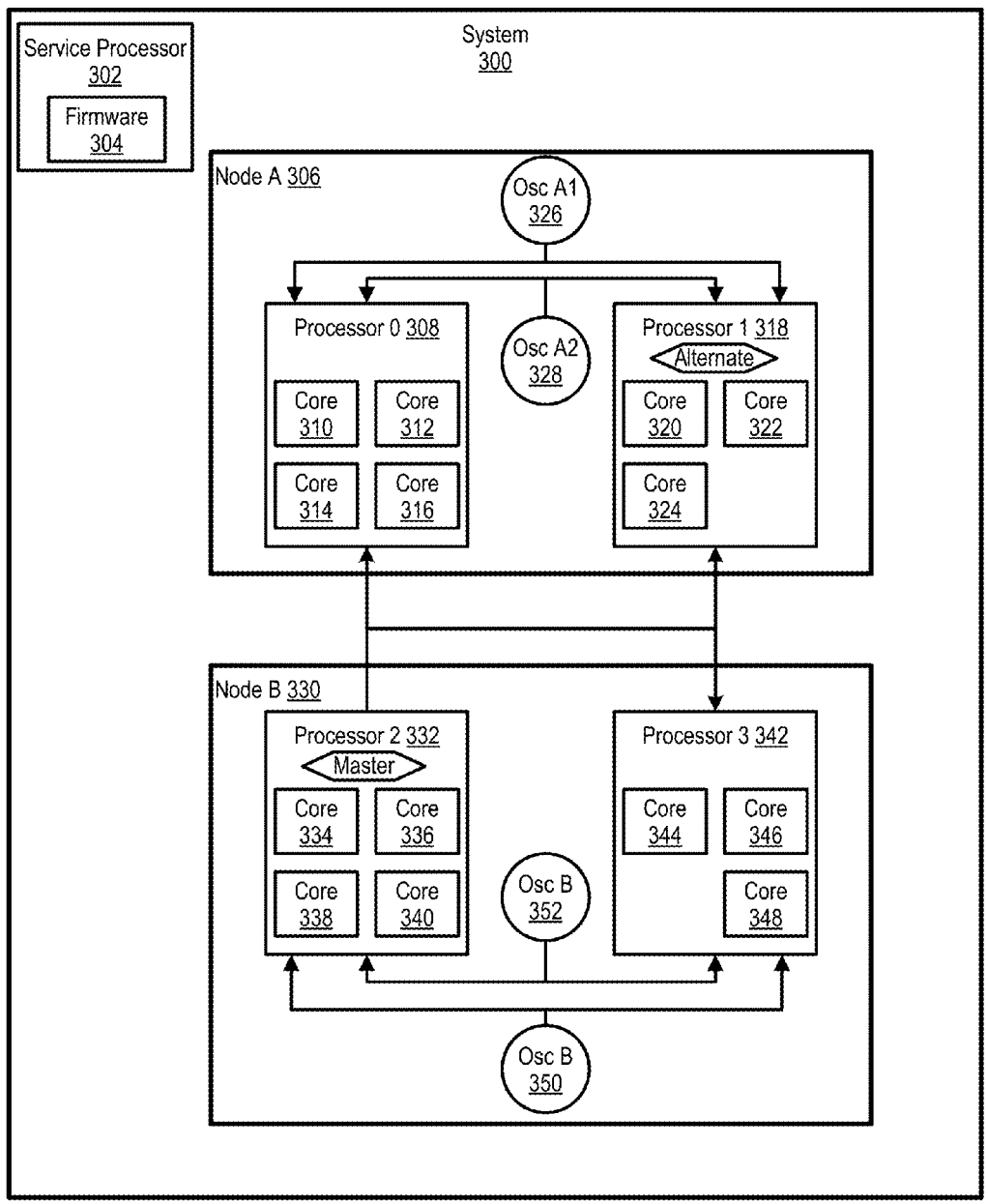
FIG. 4 is an exemplary diagram depicting a distributed computer system environment that dynamically re-configured to a backup TOD topology based upon a TOD failure on a primary TOD topology.

FIG. 4 is an exemplary diagram depicting a distributed computer system environment that dynamically re-configured to a backup TOD topology based upon a TOD failure on a primary TOD topology.

When a TOD failure requiring topology switch occurs, hardware or hypervisor firmware initiates a failover to a pre-determined backup TOD topology, which includes a pre-selected alternate master TOD processor as a new master TOD processor (processor 2 332). Subsequent to, or as part of, the re-configuration, firmware 304 proceeds through a series of steps to identify a new backup TOD topology with a different alternate master TOD processor based upon processor 2 332 being the master TOD processor, the set of TOD selection criteria discussed above, and omitting processors that were determined to contribute to the previous TOD failure. FIG. 4 shows that firmware 304 selected processor 1 318 as the alternate master TOD processor because processor 1 318 is in a different node relative to processor 2 332, and is connected to a different oscillator (presuming that processor 308 is the primary cause of the TOD failure).

Figure 5:
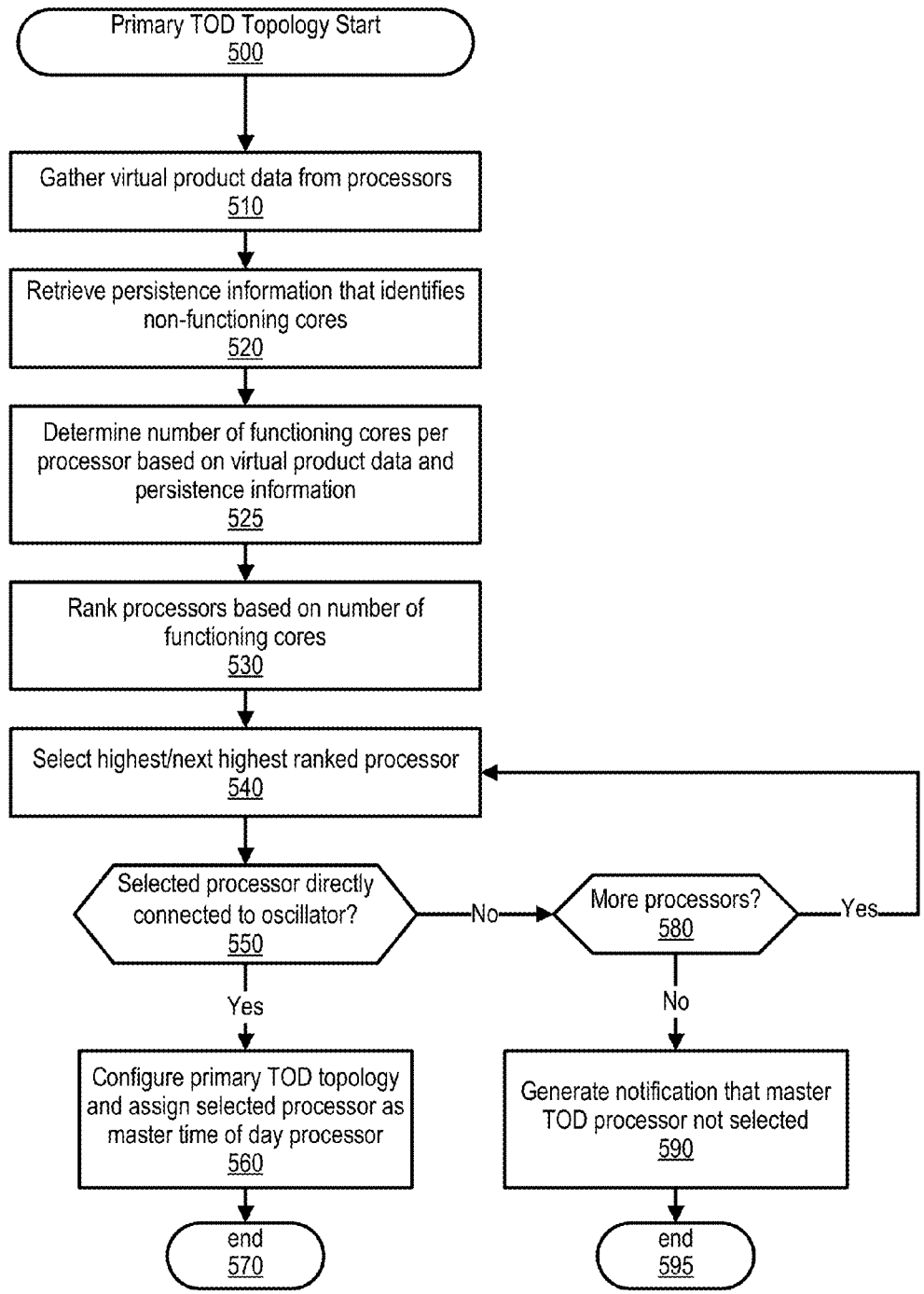
FIG. 5 is an exemplary flowchart depicting steps taken by a system to dynamically define a master TOD topology with a master TOD processor.

FIG. 5 is an exemplary flowchart depicting steps taken by a system to dynamically define a master TOD topology with a master TOD processor. FIG. 5 processing commences at 500 whereupon, at step 510, the process gathers virtual product data from the system's processors as discussed earlier.

At step 520, the process retrieves persistence information gathered from the failures encountered during previous initial program load (IPL) or runtime, that identifies non-functioning cores. At step 525, the process determines the number of functioning cores per processor based on the virtual product data and the persistence information.

At step 530, the process ranks the processors based on the number of functioning cores. For example, the process may rank processors with four functioning cores at a 4, processors with three functioning cores at a 3, and so on (4 is a higher ranking than 3). At step 540, the process selects the highest ranked processor, and determines as to whether the selected processor is directly connected to an oscillator (decision 550). If the selected processor is directly connected to a functioning oscillator, then decision 550 branches to the 'yes' branch. At step 560, the process configures a primary TOD topology and designates the selected processor as the master TOD processor, and proceeds to configure a backup TOD topology in FIG. 6. FIG. 5 processing thereafter ends at 570.

Referring back to decision 550, if the selected processor is not directly connected to a functioning oscillator, then decision 550 branches to the 'no' branch, whereupon the process determines as to whether there are more processors for which to evaluate (decision 580). If there are more processors to evaluate, then decision 580 branches to the 'yes' branch, which loops back to select and evaluate the next highest ranking processor. This looping continues until there are no more processors to evaluate. If the process did not find any processors directly connected to a functioning oscillator, decision 580 branches to the 'no' branch. At step 590, the process generates an notification that a master TOD processor was not assigned, and FIG. 5 processing thereafter ends at 595.

FIG. 6 is an exemplary flowchart depicting steps taken by a system to dynamically configure a backup TOD topology having an alternate master TOD processor. Processing commences at 600 whereupon, at step 605, the process identifies the master TOD processor's corresponding node and oscillator. For example, referring to FIG. 3, the process identifies master TOD processor 0 308's node as node A 306 and one of osc A1 326 or osc A2 328, whichever oscillator is the primary oscillator.

The process determines as to whether any processors in the system are on a different node than the master TOD and connected to a different oscillator compared to the master TOD (decision 615). For example, the process would identify processor 2 332 and processor 3 342 as processors on a different node than processor 0 308 and connected to different oscillators.

If any processors were detected on different node than the master TOD processor and connected to a different oscillator compared to the master TOD processor, then decision 615 branches to the 'yes' branch. At step 650, the process adds the detected processor(s) to a list of probable alternate master TOD processor. At step 655, the process selects, from the list of processors, the processor with the most number of functional cores and configures a backup TOD topology that designates the selected processor as the alternate master TOD processor. Referring to FIG. 3, the process designates processor 2 332 as the alternate master TOD processor. As such, when a TOD failure is detected on currently active topology, system 300 assigns processor 2 332 as the new active master TOD and performs a topology failover, and further proceeds through steps in FIG. 6 to configure a new backup TOD topology that designates a new alternate master TOD processor (see FIGS. 4, 7, and corresponding text for further details). FIG. 6 processing thereafter ends at 655.

Referring back to decision 615, if there are not any processors on a different node than the master TOD and connected to different oscillator compared to master TOD, then decision 615 branches to the 'no' branch for a second iteration that includes less stringent requirements to select an alternate master TOD processor discussed below.

The process determines as to whether there are any processors on the same node as the master TOD processor and connected to a different oscillator compared to the master TOD processor (decision 625). If there are any processors on the same node as the master TOD and connected to a different oscillator compared to the master TOD processor, then decision 625 branches to the 'yes' branch. At step 650, the process adds the detected processor(s) to a list of probable alternate master TOD processor. At step 655, the process selects, from the list of processors, the processor with the most number of functional cores and designates the selected processor as the alternate master TOD processor.

Referring back to decision 625, if there are not any processors on the same node as the master TOD processor and connected to a different oscillator compared to the master TOD processor, then decision 625 branches to the 'no' branch for a third iteration that includes less stringent requirements to select an alternate master TOD processor discussed below.

The process determines as to whether there are any processors on a different node as the master TOD and connected to an oscillator (decision 635). If there are any processors on a different node as the master TOD and connected to an oscillator, then decision 635 branches to the 'yes' branch. At step 650, the process adds the detected processor(s) to a list of probable alternate master TOD processor. At step 650, the process selects, from the list of processors, the processor with the most number of functional cores and designates the selected processor as the alternate master TOD processor in a backup TOD topology.

Referring back to decision 635, if there are not any processors on a different node as the master TOD and connected to an oscillator, then decision 635 branches to the 'no' branch for a fourth iteration that includes less stringent requirements to select an alternate master TOD processor discussed below.

The process determines as to whether there are any processors different than the master TOD on the same node as the master TOD and connected to an oscillator (decision 645). If there are any processors on the same node as the master TOD and connected to an oscillator, then decision 645 branches to the 'yes' branch. At step 650, the process adds the detected processor(s) to a list of probable alternate master TOD processor. At step 650, the process selects, from the list of processors, the processor with the most number of functional cores and designates the selected processor as the alternate master TOD processor in a backup TOD topology.

Referring back to decision 645, if there are not any processors on a same node as the master TOD and connected to an oscillator, then decision 645 branches to the 'no' branch whereupon, at step 660, the process generates an notification that no alternate master TOD processor was selected. FIG. 6 processing thereafter ends at 695.

Figure 7:
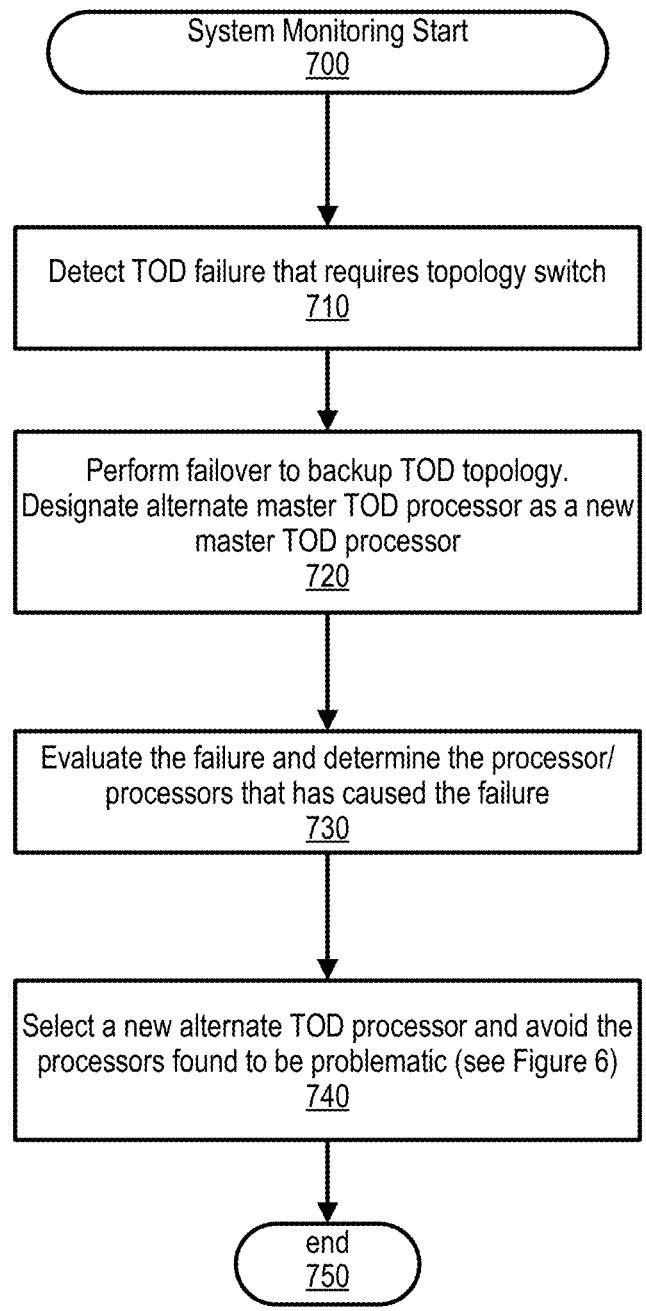
FIG. 7 is an exemplary flowchart depicting steps taken by a system that reconfigures a new backup TOD topology based upon analyzing a cause of a TOD failure in a previously active TOD topology.

FIG. 7 is an exemplary flowchart depicting steps taken by a system that reconfigures a new backup TOD topology based upon analyzing a cause of a TOD failure in a previously active TOD topology. FIG. 7 processing commences at 700 whereupon, at step 710, the process detects a TOD failure that requires a topology switch. The TOD failure may be due to, for example, a failed oscillator, a failed processor, a failed connection, or other failures that would cause TOD counters to enter in an inconsistent state.

At step 720, the system (e.g., software, hardware, or a combination of software and hardware) performs a failover that re-configures the system to the backup TOD topology. This designates the alternate master TOD processor as the new master TOD processor. For example, FIG. 4 shows that processor 2 332 is now the master TOD processor. At step 750, the process selects a new alternate master TOD processor per the steps in FIG. 6 and avoids the processors found to be problematic. Referring to FIG. 4, processor 1 318 was selected as the new alternate master TOD processor.

At step 730, the process evaluates the failure and determines the processor/processors that have caused the failure. The process then selects a new alternate master TOD processor and configures a new backup TOD topology using the steps in FIG. 6 relative to the new master TOD processor designated in step 735. FIG. 7 processing thereafter ends at 770.

While particular embodiments of the present disclosure have been shown and described, it will be obvious to those skilled in the art that based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a plurality of processors, the method comprising:
   selecting a first one of a plurality of processors as a master time of day (TOD) processor in a master TOD topology based on determining that the first processor is directly connected to a single oscillator, wherein the first processor is located on a first node;
   assigning a second one of the plurality of processors as an alternate master TOD processor to a backup TOD topology based upon determining that the second processor is on a second node that is different than the first node;
   configuring the information handling system to the master TOD topology; and
   in response to detecting a TOD failure on the master TOD topology, re-configuring the information handling system to the backup TOD topology.

2. The method of claim 1 wherein the selection of the master TOD processor further comprises:
   gathering virtual product data from the plurality of processors;
   identifying an amount of functioning cores within each of the plurality of processors;
   determining that the first processor has a largest amount of functioning cores out of the plurality of processors; and
   using the largest amount of functioning cores in the first processor as a factor during the selection of the first processor as the master TOD processor.

3. The method of claim 2 wherein the assigning of the alternate master TOD processor further comprises:
   identifying a subset of the plurality of processors that are each located on a different node than the first node and directly connected to a different oscillator than the oscillator;
   identifying an amount of functioning cores in each of the processors in the subset of processors; and
   performing the assigning of the second processor as the alternate master TOD processor based upon determining that the second processor has a largest amount of functioning cores out of the subset of processors.

4. The method of claim 1 wherein the re-configuring designates the alternate master TOD processor as a new master TOD processor and, subsequent to the re-configuring, the method further comprises:
   constructing a new backup TOD topology, wherein the new backup TOD topology further comprises:
      in response to determining that one or more third processors exist, from the plurality of processes, that are each part of a different node than the new master TOD processor and a directly connected to a different oscillator than the new master TOD's oscillator:
         selecting one of the third processors that has a largest amount of functioning cores out of the one or more third processors; and
         assigning the selected third processor to the new backup TOD topology.

5. The method of claim 4 further comprising:
   in response to determining that the one or more third processors do not exist, determining whether one or more fourth processors exist, from the plurality of processes, that are a directly connected to the different oscillator than the new master TO D's oscillator:
      selecting one of the fourth processors that has a largest amount of functioning cores out of the one or more fourth processors; and
      assigning the selected fourth processor to the new backup TOD topology.

6. The method of claim 5 further comprising:
   in response to determining that the one or more fourth processors do not exist, determining whether one or more fifth processors exist, from the plurality of processes, that are each part of the different node than the new master TOD processor and directly connected to an alternate oscillator:
      selecting one of the fifth processors that has a largest amount of functioning cores out of the one or more fifth processors; and
      assigning the selected fifth processor to the new backup TOD topology.

7. The method of claim 6 further comprising:
   in response to determining that the one or more fifth processors do not exist, determining whether one or more sixth processors exist, from the plurality of processes, that are a directly connected to a corresponding oscillator:
      selecting one of the fifth processors that has a largest amount of functioning cores out of the one or more fifth processors; and
      assigning the selected fifth processor to the new backup TOD topology.

8. An information handling system comprising:
   a plurality of processors;
   a memory coupled to at least one of the plurality of processors; and
   a set of computer program instructions stored in the memory and executed by at least one of the plurality of processors in order to perform actions of:
      selecting a first one of the plurality of processors as a master time of day (TOD) processor in a master TOD topology based on determining that the first processor is directly connected to a single oscillator, wherein the first processor is located on a first node;
      assigning a second one of the plurality of processors as an alternate master TOD processor to a backup TOD topology based upon determining that the second processor is on a second node that is different than the first node;
      configuring the information handling system to the master TOD topology; and in response to detecting a TOD failure on the master TOD topology, re-configuring the information handling system to the backup TOD topology.

9. The information handling system of claim 8 wherein at least one of the plurality of processors perform additional actions comprising:
gathering virtual product data from the plurality of processors;
identifying an amount of functioning cores within each of the plurality of processors;
determining that the first processor has a largest amount of functioning cores out of the plurality of processors; and
using the largest amount of functioning cores in the first processor as a factor during the selection of the first processor as the master TOD processor.

10. The information handling system of claim 9 wherein at least one of the plurality of processors perform additional actions comprising:
identifying a subset of the plurality of processors that are each located on a different node than the first node and directly connected to a different oscillator than the oscillator;
identifying an amount of functioning cores in each of the processors in the subset of processors; and
performing the assigning of the second processor as the alternate master TOD processor based upon determining that the second processor has a largest amount of functioning cores out of the subset of processors.

11. The information handling system of claim 8 wherein the re-configuring designates the alternate master TOD processor as a new master TOD processor and, subsequent to the re-configuring, at least one of the plurality of processors perform additional actions comprising:
constructing a new backup TOD topology, wherein the new backup TOD topology further comprises:
in response to determining that one or more third processors exist, from the plurality of processes, that are each part of a different node than the new master TOD processor and a directly connected to a different oscillator than the new master TOD's oscillator:
selecting one of the third processors that has a largest amount of functioning cores out of the one or more third processors; and
assigning the selected third processor to the new backup TOD topology.

12. The information handling system of claim 11 wherein at least one of the plurality of processors perform additional actions comprising:
in response to determining that the one or more third processors do not exist, determining whether one or more fourth processors exist, from the plurality of processes, that are a directly connected to the different oscillator than the new master TO D's oscillator:
selecting one of the fourth processors that has a largest amount of functioning cores out of the one or more fourth processors; and
assigning the selected fourth processor to the new backup TOD topology.

13. The information handling system of claim 12 wherein at least one of the plurality of processors perform additional actions comprising:
in response to determining that the one or more fourth processors do not exist, determining whether one or more fifth processors exist, from the plurality of processes, that are each part of the different node than the new master TOD processor and directly connected to an alternate oscillator:
selecting one of the fifth processors that has a largest amount of functioning cores out of the one or more fifth processors; and
assigning the selected fifth processor to the new backup TOD topology.

14. The information handling system of claim 13 wherein at least one of the plurality of processors perform additional actions comprising:
in response to determining that the one or more fifth processors do not exist, determining whether one or more sixth processors exist, from the plurality of processes, that are a directly connected to a corresponding oscillator:
selecting one of the fifth processors that has a largest amount of functioning cores out of the one or more fifth processors; and
assigning the selected fifth processor to the new backup TOD topology.

15. A computer program product stored in a computer readable storage medium, comprising computer program code that, when executed by an information handling system, causes the information handling system to perform actions comprising:
selecting a first one of a plurality of processors as a master time of day (TOD) processor in a master TOD topology based on determining that the first processor is directly connected to a single oscillator, wherein the first processor is located on a first node;
assigning a second one of the plurality of processors as an alternate master TOD processor to a backup TOD topology based upon determining that the second processor is on a second node that is different than the first node;
configuring the information handling system to the master TOD topology; and
in response to detecting a TOD failure on the master TOD topology, re-configuring the information handling system to the backup TOD topology.

16. The computer program product of claim 15 wherein the information handling system performs additional actions comprising:
gathering virtual product data from the plurality of processors;
identifying an amount of functioning cores within each of the plurality of processors;
determining that the first processor has a largest amount of functioning cores out of the plurality of processors; and
using the largest amount of functioning cores in the first processor as a factor during the selection of the first processor as the master TOD processor.

17. The computer program product of claim 16 wherein the information handling system performs additional actions comprising:
identifying a subset of the plurality of processors that are each located on a different node than the first node and directly connected to a different oscillator than the oscillator;
identifying an amount of functioning cores in each of the processors in the subset of processors; and
performing the assigning of the second processor as the alternate master TOD processor based upon determining that the second processor has a largest amount of functioning cores out of the subset of processors.

18. The computer program product of claim 15 wherein the re-configuring designates the alternate master TOD processor as a new master TOD processor and, subsequent to the re-configuring, the information handling system performs additional actions comprising:
constructing a new backup TOD topology, wherein the new backup TOD topology further comprises:
in response to determining that one or more third processors exist, from the plurality of processes, that are each part of a different node than the new master TOD processor and a directly connected to a different oscillator than the new master TOD's oscillator:
selecting one of the third processors that has a largest amount of functioning cores out of the one or more third processors; and
assigning the selected third processor to the new backup TOD topology.

19. The computer program product of claim 17 wherein the information handling system performs additional actions comprising:
in response to determining that the one or more third processors do not exist, determining whether one or more fourth processors exist, from the plurality of processes, that are a directly connected to the different oscillator than the new master TO D's oscillator:
selecting one of the fourth processors that has a largest amount of functioning cores out of the one or more fourth processors; and
assigning the selected fourth processor to the new backup TOD topology.

20. The computer program product of claim 18 wherein the information handling system performs additional actions comprising:
in response to determining that the one or more fourth processors do not exist, determining whether one or more fifth processors exist, from the plurality of processes, that are each part of the different node than the new master TOD processor and directly connected to an alternate oscillator:
selecting one of the fifth processors that has a largest amount of functioning cores out of the one or more fifth processors; and
assigning the selected fifth processor to the new backup TOD topology.

* * * * *